May 22, 1951
F. W. KUCKLINSKY
2,553,592
COATING APPARATUS FOR WRAPPING
AND CARTONING MACHINES
Filed March 19, 1947
3 Sheets-Sheet 1
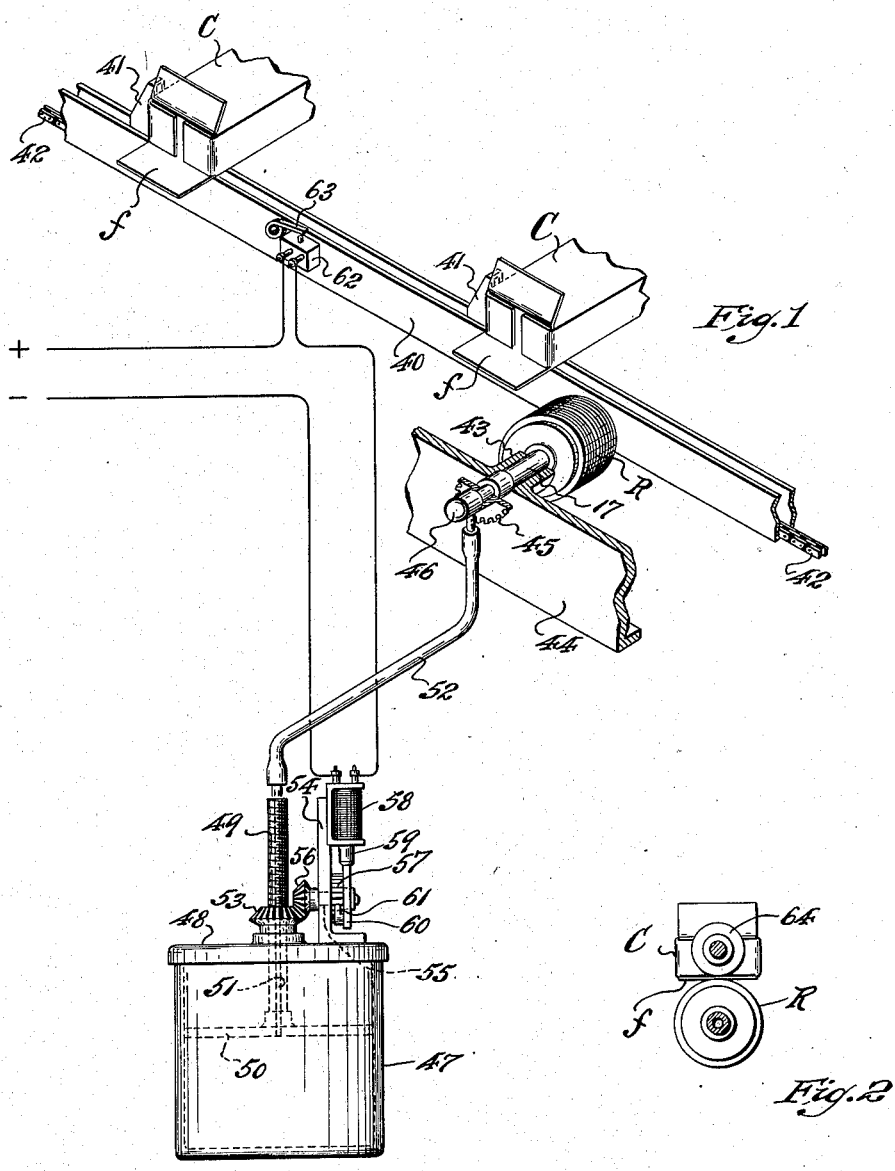
INVENTOR.
Fred W. Kucklinsky,
BY George D. Richards
Attorney May 22, 1951

F. W. KUCKLINSKY 2,553,592

COATING APPARATUS FOR WRAPPING AND CARTONING MACHINES

Filed March 19, 1947

INVENTOR.
Fred W. Kucklinsky,
BY George D. Richards
Attorney

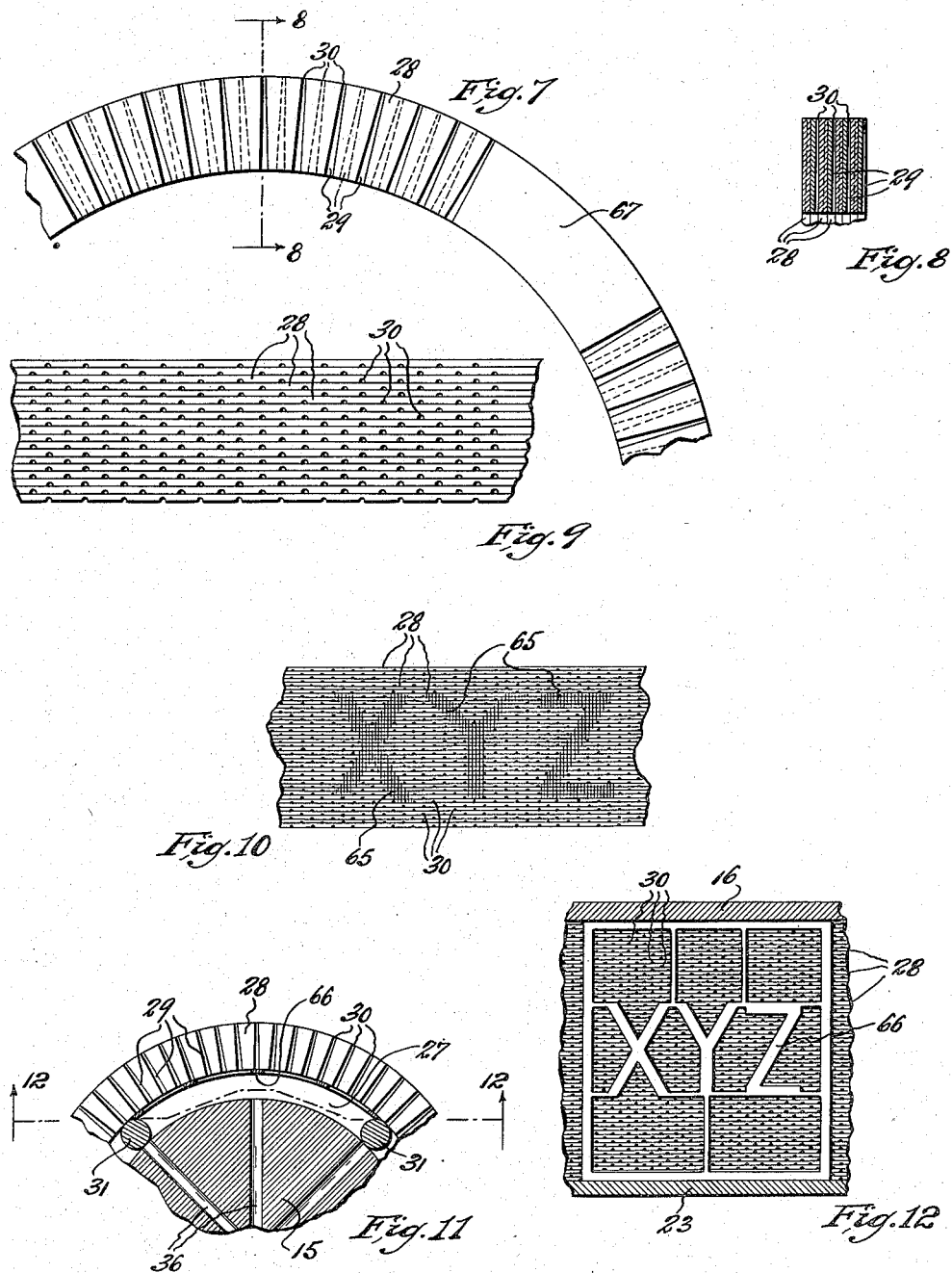

Patented May 22, 1951

2,553,592

UNITED STATES PATENT OFFICE 2,553,592

COATING APPARATUS FOR WRAPPING AND CARTONING MACHINES

Fred W. Kucklinsky, Montclair, N. J., assignor to Esther M. Kucklinsky, Montclair, N. J.

Application March 19, 1947, Serial No. 735,757

14 Claims. (Cl. 91—49)

This invention relates to improvements in coating apparatus; and the invention has reference, more particularly, to a novel means for transferring fluid material to surfaces desired to be coated therewith.

The invention has for an object to provide novel coating apparatus including a hollow applicator roller to which fluid coating material is internally supplied subject to exudation through perforate peripheral portions of the roller, whereby to be exposed upon the peripheral surface of the latter, and thence transferred to the surface of material which is moved in contact with the roller periphery; the novel coating apparatus so characterized is generally adapted to apply various kinds of fluid coating substances to surfaces desired to be treated therewith, but is especially well adapted for use in wrapping and cartoning machines, carton and package sealing machines, and many other types of machines in the action of which a gluing operation is included.

The invention has for another object to provide a novel construction of coating apparatus including an applicator roller which is internally constructed to receive supply of and to be filled with a fluid coating substance, such e. g. as a fluid adhesive or glue, the peripheral portions of which are provided with a multiplicity of discharge orifices through which the coating substance exudes to the peripheral surface of the roller, means being provided to supply the coating substance to the roller interior under pressure conditions adapted to effect suitably controlled emission of the same to the peripheral surface of said roller.

The invention has for another object to provide a novel construction of applicator roller which is internally supplied with a content of fluid coating substance adapted to be exuded through a multiplicity of discharge orifices with which the peripheral portion of said roller is provided, the structure being so devised and arranged that air is excluded from the interior thereof, and consequently hardening or deterioration of the contained coating substance by oxidation is avoided.

Another object of the invention is to provide an internally supplied fluid coating substance applicator roller which is operative in horizontal, vertical or angular selected position, as in any given case may be desirable.

Yet another object of the invention is to provide an internally supplied fluid coating substance applicator roller which may be easily arranged or conditioned to provide for skip gap application or desired surface pattern application of the coating substance to the surface or material with which the roller is operatively engaged.

Other objects of the invention, not at this time more particularly enumerated, will be understood from the following detailed description of the same.

Illustrative embodiments of the invention are shown in the accompanying drawings, in which:

Fig. 1 is a fragmentary schematic perspective view of parts of a carton sealing machine equipped with one illustrative form and arrangement of coating apparatus according to this invention so that the applicator roller of the apparatus operates to apply a fluid adhesive or glue coating to selected portions of the closure flaps of cartons desired to be closed and sealed; and Fig. 2 is a fragmentary end elevation of the applicator roller and a pressure roller which is opposed thereto for cooperation therewith.

Fig. 3 is a side elevational view of an applicator roller per se according to this invention; Fig. 4 is an end elevational view of said roller, viewed from the right in Fig. 1; Fig. 5 is a central longitudinal sectional view through said roller; and Fig. 6 is a vertical cross sectional view through said roller.

Fig. 7 is a fragmentary face view of an assembled group of radially channeled rings or annuli by which the peripheral portion of a preferred embodiment of the applicator roller according to this invention is formed, said view being drawn on an enlarged scale; Fig. 8 is a cross-sectional view, taken on line 8—8 in Fig. 7; and Fig. 9 is a plan view of the assembly shown in Fig. 7.

Fig. 10 is a fragmentary plan view of an assembled group of the radially channeled rings or annuli of the applicator roll as arranged to provide for a selected surface pattern application of exuded coating substance to a surface or material desired to be coated with said substance.

Fig. 11 is a fragmentary cross sectional view of the applicator roller showing another means for adapting the same to provide for selected surface pattern application of exuded coating substance to a surface or material desired to be treated; and Fig. 12 is a fragmentary horizontal sectional view thereof, taken on line 12—12 in Fig. 11.

Similar characters of reference are employed in the hereinabove described views to indicate corresponding parts.

Figure 3:
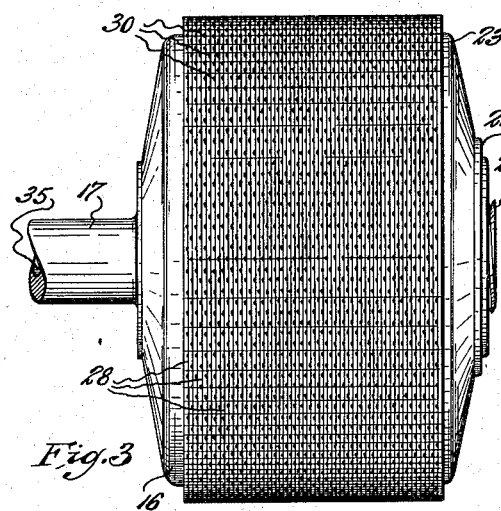
Figure 4:
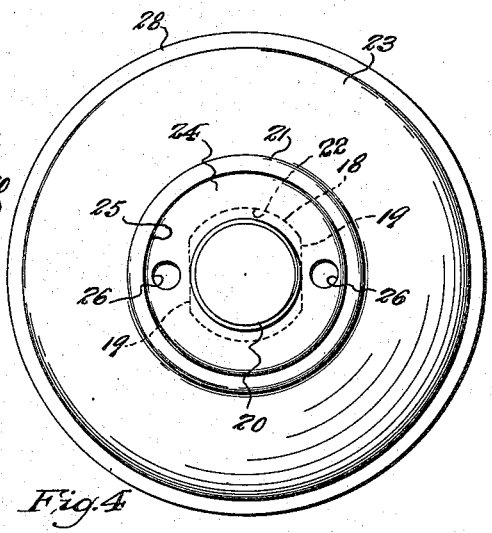

Referring to Figs. 3 to 6 of the drawings, an illustrative embodiment of the novel applicator roller, which forms an essential element of the coating apparatus according to this invention, as therein shown comprises a cylindrical main body or core 15 of suitable selected diameter and length. Formed in connection with the rear end of said body or core 15, preferably as an integral part thereof, is an external annular flange 16. Also formed in connection with the rear end of said body or core 15, preferably as an integral part thereof, is a rearwardly and axially extending arbor or drive shaft 17. Extending axially from the forward end of said body or core 15 is a coupling boss 18, which is provided at opposite sides thereof with flattened faces 19. Projecting from the outer end of said coupling boss 18 is an externally screw-threaded shank 20. At its outer end, said body or core 15, is provided with a separable cap member 21, the diameter of which conforms substantially to the diameter of said body or core. Said cap member 21 is provided with a central opening 22 which conforms in shape to the cross-sectional shape of the coupling boss 18, whereby said cap member may be non-rotatively mounted upon the latter and in opposition to the outer end face of said body or core 15. Formed in connection with said cap member 21, preferably as an integral part thereof, is an external annular flange 23 which is opposed to the annular flange 16 of said body or core 15. Threaded onto the shank 20 is a nut 24 which is operative to hold said cap member 21 detachably affixed to said body or core 15 in operative assembled relation thereto. Said nut 24 may be countersunk in an external outwardly open cavity 25 with which the cap member 21 may be provided, and said nut 24 may be provided with spanner wrench engageable sockets 26, to permit manipulation thereof by such wrench; or the nut may, optionally, be of any other desired form.

Extending between the opposed annular flanges 16 and 23 of the applicator roller structure is the perforate peripheral portion thereof, the same being concentrically outwardly spaced from the peripheral surface of the body or core 15, so as to provide a coating substance reservoir chamber 27 intermediate the body or core and said perforate peripheral portion. Said perforate peripheral portion may be variously made, but preferably comprises a laminate body formed by a plurality of relatively thin ring-like plates or annuli assembled in face to face abutting relation, and compressively retained in such relation by the thrust of the movable flange 23 toward the stationary flange 16 of the roller structure. Said plates or annuli 28 are of external diameter exceeding the external diameters of said flanges 16 and 23, so that the external peripheral surface of the assembled plates or annuli is outwardly offset from the circumferential margins of said flanges. Each plate or annulus 28 is provided on one face thereof with suitably spaced open ended radially extending channels or grooves 29, which, when opposed by the smooth face of an adjacent plate or annulus, form open ended, unobstructed discharge passages leading outwardly from the reservoir chamber 27 to the peripheral surface of the assembly of plates or annuli, thus terminating in orifices or pores 30 in the plane of said peripheral surface. Preferably said channels or grooves are of outwardly tapered form, so that the outer terminal orifices or pores 30 thereof are of relatively small cross-sectional area. In order to provide substantially uniformly relatively spaced distribution of the orifices or pores 30 throughout the area of the external peripheral surface of the assembly of plates or annuli, or over such portions of said peripheral surface as may, in given cases, be desired to be furnished with said orifices or pores, the channels or grooves of alternate plates or annuli are preferably positioned in staggered relation.

To support the assembled plates or annuli 28 in operative concentrically spaced relation to the body or core 15, and so as to be held mutually aligned against radial shift or displacement, a plurality of spacer rods 31 are engaged with and so as to extend between the flanges 16 and 23 of the roller structure, whereby to abut the internal edges of the plates or annuli 28. Said spacer rods 31 are circumferentially spaced around the body or core 15, and are preferably supported by trunnion portions 32 with which their ends are provided. Said trunnion portions 32 engage in sockets 33 with which the flanges 16 and 23 are provided, and which open out from the interior faces of the latter. Means is provided for also holding the plates or annuli 28 of the assembly thereof against relative circumferential or rotative shift or displacement, so that the preferred staggered disposition of the channels or grooves 29, and the orifices or pores 30 provided thereby, is maintained. One means for accomplishing this end is to utilize one of the spacer rods as a positioning gauge or key. For this purpose, one of the spacer rods, e. g. the spacer rod 31' as shown, may be made of larger diameter than are the others, and the internal marginal portion of each plate or annulus 28 is indented by a suitably located positioning notch 34 into which the adjacent side of the gauging or keying spacer rod 31' is entered, thus holding said plates or annuli against rotative shift, and the respective channels or grooves 29 of neighboring plates or annuli and their terminal orifices or pores 30 in desired relative disposition.

The arbor or drive shaft 17 of the body or core 15 of the applicator roller structure is provided with an axial coating substance admission or feed passage 35, which enters the outer end of said arbor or shaft 17 to extend therethrough and thence into the body or core 15 within which it terminates. Said body or core 15 is provided with radial ducts 36, of desired number and disposition, which extend from said feed passage 35 to the periphery of the body or core, so as to open into the reservoir chamber 27 from the plane of the latter.

It will be understood that a selected fluid coating substance can be delivered through the feed passage 35 and ducts 36 into and so as to fill the reservoir chamber 27. When subjected to suitably applied pressure, said coating substance is caused to flow outwardly from the reservoir chamber 27 through the channels or grooves 29 of the peripheral portion of the applicator roller structure so as to be exuded without obstruction of flow from the orifices or pores 30 onto the external peripheral surface of the roller, subject to be transferred from the latter surface onto the surface of material desired to be coated, when said applicator roller is rotated in contact with said material surface.

Figure 5:
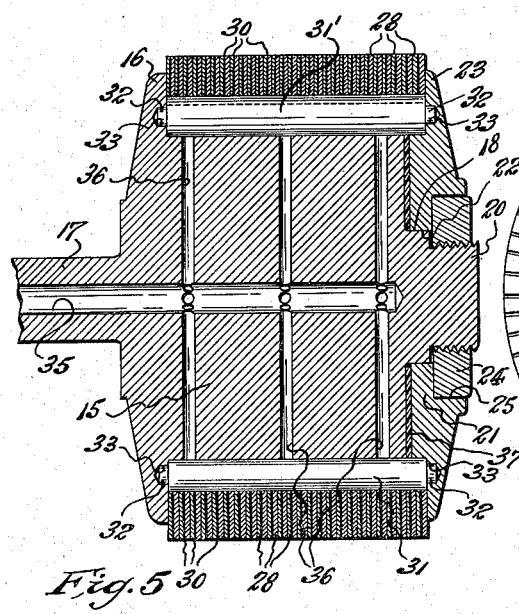
Figure 6:
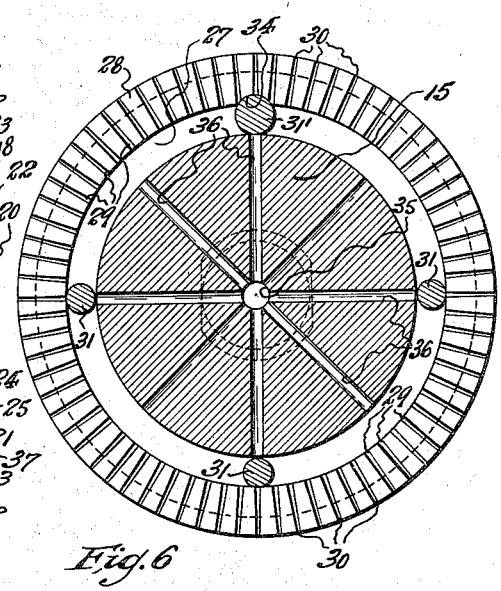

In order to assure a leak-proof joint between the body or core 15 and the separable cap member 21, a gasket 37 may be interposed between the opposed faces of the cap member and the body or core end (see Fig. 5).

In the use of the described applicator roller, suitable means would be associated therewith to supply thereto a content of fluid coating substance under sufficient pressure to assure exudation of the latter through the perforate peripheral portion of the roller onto the peripheral surface thereof, from which surface the coating substance will transfer to the surface of material relative to which the roller is caused to make rolling contact. It will be obvious that the means for supplying the coating substance to the roller under desired pressure is subject to wide variations as to specific structure and form. For the purpose of illustration, one specific form of coating substance delivery means is shown in Fig. 1, but not with limiting intention with respect to the broad or generic aspects of this invention. The form of coating substance delivery means illustrated in Fig. 1 has been also chosen to exemplify one arrangement and construction thereof which is particularly adapted for use with the applicator roller when the latter is employed for automatic application of an adhesive or glue to carton, wrapper or package parts under formation or sealing manipulation by operations of cartoning and wrapping machines, carton and package sealing machines and the like.

Referring now to Fig. 1, the reference character 40 indicates a fragmentary section of a runway rail at one side of a carton sealing machine, along which cartons C to be operated upon are moved by impeller members 41 which are mounted on a conveyer chain 42 operating in association with the runway rail 40.

The applicator roller, indicated by the reference character R in Fig. 1, is rotatably supported by its arbor or drive shaft 17 in bearing means 43 of the machine framework 44, so that the roller is operatively positioned at a desired point adjacent to the runway rail 40. Means is provided on the roller arbor or shaft 17 for applying suitably transmitted power for rotating the roller; such means being illustratively shown as comprising a gear or sprocket wheel 45. Mounted on the outer end portion of the roller arbor or shaft 17 is a swivel joint connection 46, through which glue is delivered from a source of supply into the feed passage 35 of the arbor or shaft 17, and thence into the interior of the roller R.

The reference character 47 indicates a glue supply reservoir having a top cover 48. Slidably extending through said top cover 48 is an externally screw-threaded piston rod 49 upon the inner end of which is mounted a piston 50. Said piston 50 conforms to the internal cross-sectional shape of the glue supply reservoir, and slidably fits the same so as to be movable downwardly therethrough against the glue content thereof. Downward movement of the piston 50 operates to expel glue from the supply reservoir 47 through an axial passage 51 in the piston rod 49, and thence through a suitably arranged conduit or hose 52 which is interconnected between the exterior end of said piston rod 49 and the swivel connection 46 leading into the roller R.

Means is provided for imparting glue expressing impulse to the piston 50. In an illustrative form thereof as shown, this means comprises a rotatable internally screw-threaded bevel gear 53 which operatively engages the threads of the piston rod 49 as a nut. Mounted on the reservoir top cover 48 is a standard 54, and journaled in said standard, to rotate therein, is a transverse shaft 55 which has a fixed bevel gear 56 on one end in mesh with gear 53. Affixed on the opposite end of said shaft 55 is a ratchet wheel 57. Mounted on said standard 54, above the ratchet wheel 57, is a solenoid 58, the armature 59 of which terminates in an extension 60. Carried by said extension 60 is a spring-pressed pawl 61, which operatively engages said ratchet wheel 57. When the solenoid 58 is energized, its armature 59 and extension 60 thereof is moved axially, thereby causing the pawl 61 to move and thrust against a tooth of the ratchet wheel 57 engaged thereby, thus imparting an operative rotative movement to said ratchet wheel and to the shaft 55 and drive gear 56. The rotative movement thus imparted to the drive gear 56 is transmitted to the bevel gear 53 which, acting as a nut upon the screw-threaded piston rod 49, effects a limited downward movement of said piston rod, and thereby causes an accompanying down thrust of the piston 50 within the supply reservoir 47. This down thrusting movement of the piston 50 reacts upon the glue content of the supply reservoir so as to force a modicum of glue through the conduit or hose 52, and thence into the reservoir chamber 27 of the applicator roller R, whereby to in turn effect exudation of glue from said reservoir chamber onto the external peripheral surface of the roller, ready for transfer therefrom to the surface of a carton closure flap $f$ which is moved in contact with the periphery of said roller. When the solenoid 58 is de-energized, the armature 59 and its extension 60 return to normal initial position, thereby carrying the pawl 61 back to its normal initial position; said pawl during such recovery stroke movement yielding relative to the ratchet wheel teeth so as to ride thereover; all whereby the glue delivery means is made ready for a succeeding glue delivery impulse.

The means for supplying glue to the applicator roller R, when the latter is used in a carton sealing or like machine, is preferably arranged to be controlled by the movement of the cartons to be treated toward said applicator rollers, whereby to suitably time the glue delivery impulses of the glue supplying means so as to effect exudation of the glue to the peripheral surface of the roller prior to each engagement of the latter with a carton flap desired to be glue coated. An illustrative form of controlling means, as shown in Fig. 1, comprises a suitable electric switch 62, which is mounted on or adjacent to the carton runway rail 40 in advance of the applicator roller station. Said switch 62 is connected in the electric power circuit by which the solenoid 58 is served, and in series with the latter. Cooperative with said switch is a yieldable switch actuator means 63, which lies in the path of a carton C advancing along the runway rail 40 toward the applicator roller R, whereby to be engaged by an advancing carton so as to be moved thereby to momentarily close the switch 62. It will be obvious that closing of the switch 62 delivers energizing current to the solenoid 58, whereby to actuate the glue delivery means in the manner already hereinabove explained, so that glue is exuded from the applicator roller interior onto its peripheral surface prior to arrival of a carton C at the applicator station, and thus ready to be transferred to the carton flap $f$ as said carton passes the applicator roller station. In this way the glue exudation impulses are automatically timed to successively occur as successive cartons approach the applicator roller station. In order to hold the carton flap $f$ in operative contact with the peripheral surface of the applicator roll R during the glue applying action of the latter, means is provided for pressing said flap toward said roller. This means usually comprises a presser roller 64 (see Fig. 2) the periphery of which is opposed to that of said applicator roller.

It is sometimes desirable to apply a glue or other coating to a surface in a predetermined pattern. For example, it is sometimes desirable to apply the glue to a carton closure flap so as to leave uncoated areas of the latter in the form of letters, numerals, trade-mark symbols or other designs, whereby to provide means for detecting occurrence of tampering with or surreptitious opening of the closed and sealed carton, and thus aid in protecting the integrity of the latter. A glue coating so characterized will disclose the included pattern when the carton is opened by the consumer, but if the carton, prior to reaching the consumer, has been surreptitiously opened and resealed, in the resealing it will be very difficult to apply resealing glue without covering or smearing the uncoated pattern forming portions of the carton flap, and consequently when the carton is finally opened by the consumer, the effaced or defaced pattern will at once disclose that the carton has been previously tampered with. The novel applicator roller of this invention readily lends itself to simple and easy modification for attainment of the aforesaid purpose. For example, as indicated in Fig. 10, channels or grooves 29 and their orifices 30 may be either omitted or plugged against glue passage with respect to selected areas of the peripheral surface of the applicator roller, whereby to form, by such imperforate areas 65, the desired pattern, illustratively shown in Fig. 10 as comprising the letters XYZ. Another method of attaining the same result, as shown in Figs. 11 and 12, comprises the provision of a pattern templet 66 of selected form, again illustratively shown as comprising the letters XYZ. This pattern templet is suitably secured in overlying relation to the interior surface of the assembly of plates or annuli 28, so as to block off exudation of glue through channels or grooves 29 in areas conforming to the configuration of the pattern templet. It will also be understood that areas of the peripheral surface of the applicator roller may be arranged to be imperforate in one or more selected segments thereof (as indicated at 65 in Fig. 7) whereby to provide skip gap application of coating substance by the roller, when such mode of operation is desired.

I am aware that many changes could be made in both the details of construction of the applicator roller per se and in the type of construction of the coating substance supply mechanism and its control means by which the applicator roller is served, without departing from the scope of this invention as defined in the following claims. It is therefore intended that all matter contained in the foregoing description or shown in the accompanying drawings shall be interpreted as illustrative and not in a limiting sense.

I claim:

1. A coating substance applicator roller comprising a body formed to provide an internal coating substance reservoir chamber, said roller having a peripheral portion surrounding said reservoir chamber formed by an assembly of annular plates in face to face abutment transverse to the roller axis, and said plates having open ended radial channels in faces thereof extending from their internal to their external edges through which the coating substance contained in the reservoir chamber exudes without obstruction of flow to the peripheral surface of the roller.

2. A coating substance applicator roller comprising a body formed to provide an internal coating substance reservoir chamber, said roller having a peripheral portion surrounding said reservoir chamber formed by an assembly of annular plates in face to face abutment transverse to the roller axis, said plates having open ended radial channels in faces thereof extending from their internal to their external edges through which the coating substance contained in the reservoir chamber exudes without obstruction of flow to the peripheral surface of the roller, and said body having an axial shaft provided with coating substance delivery passage means leading into said reservoir chamber.

3. A coating substance applicator roller comprising a body formed by axially aligned separable parts each having peripheral flanges, said roller having a peripheral portion formed by an assembly of annular plates in face to face abutment to extend between said flanges and spaced concentric to said body parts whereby to provide an intermediate coating substance reservoir chamber, means to secure said body parts together with the flanges thereof in compressive holding relation to said plate assembly, said plates having open ended radial channels in faces thereof extending from their internal to their external edges through which the coating substance contained in the reservoir chamber exudes without obstruction of flow to the external surface of the peripheral portion formed by said plate assembly, and said body having an axial shaft provided with coating substance delivery passage means leading into said reservoir chamber.

4. A coating substance applicator roller comprising a body formed by axially aligned separable parts each having peripheral flanges, said roller having a peripheral portion formed by an assembly of annular plates in face to face abutment to extend between said flanges and spaced concentric to said body parts whereby to provide an intermediate coating substance reservoir chamber, means to secure said body parts together with the flanges thereof in compressive holding relation to said plate assembly, said plates having open ended radial channels in faces thereof extending from their internal to their external edges through which the coating substance contained in the reservoir chamber exudes without obstruction of flow to the external surface of the peripheral portion formed by said plate assembly, means to retain the plates of the assembly thereof against relative radial and circumferential displacement, and said body having axial shaft provided with coating substance delivery passage means leading into said reservoir chamber.

5. A coating substance applicator roller comprising a body formed to provide an internal coating substance reservoir chamber, said roller having a peripheral portion surrounding said reservoir chamber formed by an assembly of annular plates in face to face abutment transverse to the roller axis, said plates having open ended radial channels in faces thereof extending from their internal to their external edges through which the coating substance contained in the reservoir chamber exudes without obstruction of flow to the peripheral surface of the roller, and means to retain the plates of the assembly thereof against relative radial and circumferential displacement.

6. A coating substance applicator roller comprising a body formed to provide an internal coating substance reservoir chamber, said roller having a peripheral portion surrounding said reservoir chamber formed by an assembly of annular plates in face to face abutment transverse to the roller axis, said plates having open ended radial channels in faces thereof extending from their internal to their external edges through which the coating substance contained in the reservoir chamber exudes without obstruction of flow to the peripheral surface of the roller, means to retain the plates of the assembly thereof against relative radial and circumferential displacement, and said body having an axial shaft provided with coating substance delivery passage means leading into said reservoir chamber.

7. A coating substance applicator roller as defined in claim 2 wherein the peripheral portion of the roller includes means to block selected radial passage and thereby prevent exudation of coating substance therethrough to peripheral surface areas thereof of selected pattern configuration.

8. A coating substance applicator roller as defined in claim 3 wherein the peripheral portion of the roller includes means to block selected radial channels and thereby prevent exudation of coating substance therethrough to peripheral surface areas thereof of selected pattern configuration.

9. A coating substance applicator roller as defined in claim 4 wherein the peripheral portion of the roller includes means to block selected radial channels and thereby prevent exudation of coating substance therethrough to peripheral surface areas thereof of selected pattern configuration.

10. Coating apparatus for the purposes described comprising a rotatable applicator roller having a body formed to provide an internal coating substance reservoir chamber, a drive shaft for said roller, said roller having a peripheral portion surrounding said reservoir chamber formed by an assembly of annular plates in face to face abutment transverse to the roller axis, said plates having open ended radial channels in faces thereof extending from their internal to their external edges, said drive shaft and body having coating substance delivery passage means leading into said reservoir chamber, and means for delivering coating substance from a source of supply through said delivery passage means into said reservoir chamber, whereby the pressure of entering coating substance causes said substance to be exuded without obstruction of flow through said plate channels from the reservoir chamber onto the peripheral surface of the roller.

11. Coating apparatus for the purposes decribed comprising a rotatable applicator roller having a body formed to provide an internal coating substance reservoir chamber, a drive shaft for said roller, said roller having a peripheral portion surrounding said reservoir chamber formed by an assembly of annular plates in face to face abutment transverse to the roller axis, said plates having open ended radial channels in faces thereof extending from their internal to their external edges, said drive shaft and body having coating substance delivery passage means leading into said reservoir chamber, conducting means leading from a source of coating substance supply to said delivery passage means, forcing means operative to deliver the coating substance through said conducting means and thence through said delivery passage means and into the roller reservoir chamber, and means to intermittently actuate said forcing means, whereby the pressure of coating substance entering said reservoir chamber causes said substance to be exuded without obstruction of flow through said plate channels from said reservoir chamber onto the peripheral surface of the roller.

12. Coating apparatus for the purposes described comprising a rotatable applicator roller having a body formed to provide an internal coating substance reservoir chamber, a drive shaft for said roller, said roller having a peripheral portion surrounding said reservoir chamber provided with open ended radial passages extending from said chamber to the roller periphery, said drive shaft and body having coating substance delivery passage means leading into said reservoir chamber, conducting means leading from a source of coating substance supply to said delivery passage means, forcing means operative to deliver the coating substance through said conducting means, delivery passage means and into the roller reservoir chamber, and electromechanical means to intermittently actuate said forcing means, whereby the pressure of coating substance entering said reservoir chamber causes said substance to be exuded without obstruction of flow through the perforate peripheral portion of said roller onto the peripheral surface thereof.

13. A coating substance applicator roller as defined in claim 1 wherein said radial channels are tapered to provide openings having sides which converge along a line progressing outwardly from the axis of rotation.

14. Coating apparatus for the purposes described comprising conveyor means adapted to move successive articles to be coated in succession through an applicator station, an applicator roller rotatably mounted at said station and having a hollow body providing an internal coating substance reservoir and open ended radial channels for unobstructed flow leading from said chamber to the roller periphery, a supply reservoir for the coating substance, conducting passage means connecting said supply reservoir with said reservoir chamber of the applicator roller, movable expelling means for said supply reservoir, impulsive actuating means for said expelling means having a predetermined degree of movement for each impulse, whereby to cause exudation of a modicum of coating substance through the said radial channels to the roller periphery, and means coordinated with movement of the article conveyor means for imparting an impulse to said actuating means preceding each advance into applicator station of an article to be coated.

FRED W. KUCKLINSKY.

REFERENCES CITED

The following references are of record in the file of this patent:

UNITED STATES PATENTS

| Number | Name | Date |
|---|---|---|
| 875,546 | Metzner | Dec. 31, 1907 |
| 1,177,787 | MacLaurin et al. | Apr. 4, 1916 |
| 1,276,452 | Tuck | Aug. 20, 1918 |
| 1,417,820 | Goodman | May 30, 1922 |
| 1,438,408 | Strawn | Dec. 12, 1922 |
| 1,468,446 | Graham | Sept. 18, 1923 |
| 1,541,787 | Cadgene et al. | June 16, 1925 |
| 1,570,857 | Perkins | Jan. 26, 1926 |
| 1,727,978 | Huebner | Sept. 10, 1929 |
| 1,794,896 | Hauck | Mar. 3, 1931 |
| 2,189,765 | Takats | Feb. 13, 1940 |
| 2,272,368 | Duffy | Feb. 10, 1942 |
| 2,274,432 | Repsher et al. | Feb. 24, 1942 |
| 2,319,616 | Luehrs | May 18, 1943 |